United States Patent
Yu et al.

(10) Patent No.: US 11,005,755 B2
(45) Date of Patent: May 11, 2021

(54) PACKET PROCESSING METHOD IN CLOUD COMPUTING SYSTEM, HOST, AND SYSTEM

(71) Applicant: Huawei Technologies Co., Ltd., Guangdong (CN)

(72) Inventors: Zhou Yu, Xi'an (CN); Leiqiang Zhang, Xi'an (CN); Yuxin Zhuang, Beijing (CN); Hao Luo, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/253,930

(22) Filed: Jan. 22, 2019

(65) Prior Publication Data

US 2019/0158396 A1     May 23, 2019

Related U.S. Application Data (63) Continuation of application No. PCT/CN2016/105228, filed on Nov. 9, 2016.

(51) Int. Cl.
*H04L 12/713* (2013.01)
*H04L 12/741* (2013.01)
(Continued)

(52) U.S. Cl.
CPC ........ *H04L 45/586* (2013.01); *G06F 9/45533* (2013.01); *H04L 12/4641* (2013.01);
(Continued)

(58) Field of Classification Search
CPC ............. G06F 9/45533; H04L 12/4641; H04L 41/145; H04L 45/42; H04L 45/586;
(Continued)

(56) References Cited

U.S. PATENT DOCUMENTS 8,964,600 B2   2/2015  Biswas et al.
9,928,107 B1 * 3/2018  Vincent ................ G06F 9/4856
(Continued)

FOREIGN PATENT DOCUMENTS

CA    2991208 A1   5/2018
CA    2991359 A1   5/2018
(Continued)

OTHER PUBLICATIONS

Espacenet translation of CN102457586 A (Year: 2012).*
(Continued)

*Primary Examiner* — Joe Chacko
(74) *Attorney, Agent, or Firm* — Leydig, Voit & Mayer, Ltd.

(57) ABSTRACT

A packet processing method in a computing system is disclosed. The computing system comprises a host, wherein at least one network interface card is connected to the host. The network interface card includes switching equipment and at least two network ports. A first network port is corresponding to at least one physical function PF and multiple virtual functions VFs. At least one VF of the first network port is provided for a first virtual machine on the host in a passthrough manner. The first virtual machine sends a data packet from the VF that is connected to the first virtual machine. Switching equipment of the first network port forwards the data packet according to a destination MAC address of the data packet, and sends the data packet to a virtual bridge on VMM of the host. The VMM provides abundant network function processing for the data packet.

24 Claims, 5 Drawing Sheets

(51) Int. Cl.
*H04L 29/12* (2006.01)
*G06F 9/455* (2018.01)
*H04L 12/46* (2006.01)
*H04L 12/24* (2006.01)

(52) U.S. Cl.
CPC .......... *H04L 41/145* (2013.01); *H04L 45/745* (2013.01); *H04L 61/103* (2013.01); *H04L 61/2007* (2013.01); *H04L 61/6022* (2013.01)

(58) Field of Classification Search
CPC ..... H04L 45/745; H04L 49/70; H04L 61/103; H04L 61/2007; H04L 61/6022
See application file for complete search history.

(56) References Cited

U.S. PATENT DOCUMENTS

| | | | |
|---|---|---|---|
| 2010/0107162 A1* | 4/2010 | Edwards | H04L 45/58 718/1 |
| 2010/0115101 A1* | 5/2010 | Lain | H04L 45/02 709/227 |
| 2012/0250686 A1 | 10/2012 | Vincent et al. | |
| 2013/0031233 A1 | 1/2013 | Feng et al. | |
| 2013/0117530 A1* | 5/2013 | Kim | G06F 9/45558 711/206 |
| 2013/0308641 A1 | 11/2013 | Ackley | |
| 2013/0315060 A1 | 11/2013 | Aybay et al. | |
| 2014/0003442 A1 | 1/2014 | Hernandez et al. | |
| 2014/0089486 A1 | 3/2014 | Natham et al. | |
| 2014/0208317 A1 | 7/2014 | Nakagawa | |
| 2014/0269709 A1* | 9/2014 | Benny | H04L 61/2007 370/392 |
| 2015/0026681 A1* | 1/2015 | Lin | G06F 9/45533 718/1 |
| 2015/0063364 A1* | 3/2015 | Thakkar | H04L 45/7453 370/401 |
| 2015/0113114 A1 | 4/2015 | Zhang et al. | |
| 2015/0127830 A1 | 5/2015 | Brown et al. | |
| 2015/0215207 A1 | 7/2015 | Qin et al. | |
| 2015/0326524 A1 | 11/2015 | Tankala et al. | |
| 2016/0232019 A1 | 8/2016 | Shah et al. | |
| 2016/0350151 A1 | 12/2016 | Zou et al. | |
| 2016/0373359 A1* | 12/2016 | Bruun | H04L 47/20 |

FOREIGN PATENT DOCUMENTS

| | | |
|---|---|---|
| CN | 101309180 A | 11/2008 |
| CN | 102457586 A | 5/2012 |
| CN | 102790777 A | 11/2012 |
| CN | 103051529 A | 4/2013 |
| CN | 103346981 A | 10/2013 |
| CN | 103609077 A | 2/2014 |
| CN | 103621026 A | 3/2014 |
| CN | 103873374 A | 6/2014 |
| CN | 103916314 A | 7/2014 |
| CN | 105978828 A | 9/2016 |
| JP | 2014143560 A | 8/2014 |
| KR | 20150002426 A | 1/2015 |
| WO | 2014065315 A1 | 5/2014 |
| WO | 2016107594 A1 | 7/2016 |

OTHER PUBLICATIONS

Dong et al, "High Performance Network Virtualization with SR-IOV," 2009 IEEE, pp. 1-11, Institute of Electrical and Electronics Engineers—New York, New York (2010).
"IEEE 802 Tutorial: Edge Virtual Bridging," Atlanta, GA, pp. 1-54, Institute of Electrical and Electronics Engineers—New York, New York (Nov. 2009).
Kamath et al, "Edge Virtual Bridge Proposal, Version 0, Rev 0.1," pp. 1-72 (Apr. 23, 2010).
Xu "Virtual Subnet: A Scalable Data Center Interconnection Solution; draft-xu-virtual-subnet-05.txt," Network working group, Internet Draft, XP015075250, pp. 1-10, IETF Trust (Apr. 11, 2011).
Postel "Multi-LAN Address Resolution," Network Working Group, Request for Comments: 925, XP015006918, (Oct. 1, 1984).
"In-switch ARP handling with OpenState," XP055602384, Quentin Monnet, Whirl Offload, Retrieved from the Internet: https://qmonnet.github.io/whirl-offload/2016/11/05/in-switch-arp-with-openstate/, pp. 1-6 (Nov. 5, 2016).

* cited by examiner

PACKET PROCESSING METHOD IN CLOUD COMPUTING SYSTEM, HOST, AND SYSTEM

CROSS-REFERENCE TO RELATED APPLICATIONS

This application is a continuation of International Application No. PCT/CN2016/105228, filed on Nov. 9, 2016, the disclosure of which is hereby incorporated by reference in its entirety.

TECHNICAL FIELD

The present application relates to the field of IT technologies, and in particular, to a packet processing method in a cloud computing system, a host, and a system.

BACKGROUND

A virtualization technology is one of key technologies in the cloud computing field. According to the virtualization technology, physical resources of a host can be abstracted into a shared resource pool to be used by virtual machines (VM) running on the host. The virtual machines running on the host may share a network interface card of the host to communicate with an external network of the host. In the prior art, the network interface card may be allocated, by means of network interface card virtualization, to the virtual machines for use. Network interface card virtualization may be implemented by means of single-root input/output virtualization (SR-IOV) or multi-root input/output virtualization (MR-IOV). The network interface card virtualization is also referred to as network interface card passthrough. SR-IOV passthrough is used as an example. When the network interface card supports SR-IOV, the virtual machines running on the host may share the network interface card on the host by using an SR-IOV technology.

When a network interface card supporting an SR-IOV capability is used on the host, a network port of the network interface card is virtualized into at least one physical function (PF) and multiple virtual functions (VF). A virtual machine on the host is connected to at least one VF. The network interface card is internally provided with switching equipment that functions as a switch. The switching equipment forwards a data packet according to a media access control (MAC) table, and forwards a data packet between a physical network port, the PF, and the VF. Because of limited processing and storage capabilities, the switching equipment cannot provide a user with abundant network functions such as a security group, quality of service (QoS), layer 2 tunnel encapsulation, and distributed routing.

SUMMARY

This specification describes a packet processing method in a cloud computing system, a host, and a system, to resolve a problem that abundant network functions cannot be provided in a network interface card passthrough scenario.

According to a first aspect, an embodiment of the present application provides a host. At least one network interface card is connected to the host. A virtual machine monitor VMM runs on the host, and a first virtual machine runs on the VMM. The VMM includes a virtual bridge and a virtual network function module, and the virtual network function module can provide a network function processing capability. The network interface card includes switching equipment and at least two network ports. A first network port supports a network interface card virtualization capability, the first network port is corresponding to at least one physical function PF and multiple virtual functions VFs, and at least one VF of the first network port is provided for the first virtual machine in a passthrough manner.

The first virtual machine sends a data packet from the VF that is connected to the first virtual machine. A destination MAC address of the data packet is a MAC address of an uplink port of the virtual bridge. The switching equipment of the first network port forwards the data packet according to the destination MAC address of the data packet, and sends the data packet to the virtual bridge on the VMM. The virtual bridge transfers the data packet to the virtual network function module. The virtual network function module provides abundant network functions for the data packet. In a network interface card passthrough scenario, after sending a data packet from a passthrough VF, a virtual machine may direct the data packet from a network interface card to a virtual network function module on a VMM in the foregoing manner, and provide abundant network functions for a user by using the software module.

In a possible design, multiple virtual machines may run on the host, each virtual machine is connected to at least one VF of the first network port, and the multiple VFs of the first network port have different virtual local area network VLAN identifiers. A VLAN identifier different from a VLAN identifier of another VF is set for each VF. This ensures that a broadcast packet carrying a VLAN identifier is propagated only on a virtual local area network corresponding to the VLAN identifier and is not sent to another VF with a different VLAN identifier.

In a possible design, the first virtual machine obtains the destination MAC address of the to-be-sent data packet by using an ARP process. Specifically:

The first virtual machine sends an ARP request packet by using the VF that is connected to the first virtual machine, where the ARP request packet carries a VLAN identifier of the VF that sends the ARP request packet;

after receiving the ARP request packet, the switching equipment of the first network port broadcasts the ARP request packet; after receiving the ARP request packet broadcast by the switching equipment, the virtual bridge on the VMM forwards the ARP request packet to an SDN controller, where the SDN controller records network topology information of a cloud computing system; and when receiving the ARP request packet, the SDN controller constructs a flow entry, and returns the flow entry to the virtual bridge, where the flow entry includes an ARP pickup setting, the ARP pickup setting is used to instruct the virtual bridge to construct an ARP response packet, and the ARP response packet carries the MAC address that is of the uplink port of the virtual bridge and that is used as the destination MAC address of the to-be-sent data packet; and the virtual bridge returns the ARP response packet to the first virtual machine according to the flow entry, where the ARP response packet carries the MAC address that is of the uplink port of the virtual bridge and that is used as the destination MAC address of the to-be-sent data packet.

In this embodiment of the present application, a new ARP process is defined. The destination MAC address of the to-be-sent data packet is set to the MAC address of the uplink port of the virtual bridge, so that the data packet sent by the first virtual machine is forwarded to the virtual bridge by means of layer 2 forwarding, and the data packet is redirected back to the VMM from the network interface card.

In a possible design, the flow entry further includes a MAC address setting, and the MAC address setting is used to instruct the virtual bridge to change the destination MAC address of the data packet to a MAC address of a second virtual machine when the virtual bridge receives the data packet that is sent by the first virtual machine to the second virtual machine. The destination MAC address of the data packet sent by the first virtual machine is the MAC address of the uplink port of the virtual bridge. Therefore, when receiving the data packet, the virtual bridge needs to replace the destination MAC address of the data packet with the MAC address of the second virtual machine, so that the data packet sent by the virtual bridge can be routed to the second virtual machine according to a real address of the second virtual machine.

In a possible design, the uplink port of the virtual bridge is a PF of the first network port, and the virtual bridge is connected to the network interface card by using the PF; or the uplink port of the virtual bridge is a selected VF of the first network port, and the virtual bridge is connected to the network interface card by using the selected VF, where the selected VF that is connected to the virtual bridge is set to a promiscuous mode. It should be noted that, that the virtual bridge is connected to the network interface card by using the PF or the VF means that the virtual bridge is logically connected to the network interface card, that is, the data packet is transmitted between the virtual bridge and the network interface card by using the PF or the VF.

In a possible design, a source virtual machine (the first virtual machine) and a destination virtual machine (the second virtual machine) of the data packet are on a same host. In this case, after processing the data packet, the virtual network function module returns the processed data packet to the virtual bridge. The virtual bridge receives the processed data packet, and sends the processed data packet to the second virtual machine according to the destination MAC address of the data packet by using the switching equipment.

Alternatively, the second virtual machine and the first virtual machine may run on different hosts. In this case, the virtual network function module establishes a tunnel between the virtual network function module and another virtual network function module on a host on which the second virtual machine is located, sends the processed data packet to a second network port of the network interface card, and then sends, by using the tunnel, the processed data packet to the host on which the second virtual machine is located, so that the another virtual network function module sends the processed data packet to the second virtual machine.

According to a second aspect, an embodiment of the present application further provides a packet processing method in a cloud computing system. At least one host in the cloud computing system includes a virtual machine monitor VMM and at least one network interface card. A first virtual machine runs on the host. The VMM includes a virtual bridge and a virtual network function module. The network interface card includes switching equipment and at least two network ports. A first network port supports a network interface card virtualization capability. The first network port is corresponding to at least one PF and multiple VFs. The first virtual machine is connected to at least one VF of the first network port. The method includes:

determining, by the first virtual machine, a destination MAC address of a to-be-sent data packet, where the MAC address of the to-be-sent data packet is a MAC address of an uplink port of the virtual bridge;

sending, by the first virtual machine, the data packet to a second virtual machine by using the VF that is connected to the first virtual machine, where a destination IP address carried in the data packet is an IP address of the second virtual machine, and the destination MAC address carried in the data packet is the MAC address of the uplink port of the virtual bridge;

receiving, by the switching equipment, the data packet, and sending the data packet to the virtual bridge according to the destination MAC address of the data packet by using the uplink port of the virtual bridge;

receiving, by the virtual bridge, the data packet, changing the destination MAC address of the data packet to a MAC address of the second virtual machine, and sending a changed data packet to the virtual network function module; and performing, by the virtual network function module, network function processing on the changed data packet, and sending the processed data packet, where a destination MAC address of the processed data packet is the MAC address of the second virtual machine.

In a possible design, the multiple VFs of the first network port have different virtual local area network VLAN identifiers.

In another possible design, the first virtual machine obtains the destination MAC address of the to-be-sent data packet from an SDN controller by using an ARP process. The destination MAC address is the MAC address of the uplink port of the virtual bridge. A specific obtaining manner is the same as that in the description in the first aspect.

According to a third aspect, an embodiment of the present application provides a cloud computing system. The cloud computing system includes the host described in the first aspect and an SDN controller. The SDN controller is configured to receive an ARP request packet from a first virtual machine that is forwarded by a virtual bridge, and return a flow entry to the virtual bridge. The flow entry includes an ARP pickup setting and a MAC address setting, the ARP pickup setting is used to instruct the virtual bridge to construct an ARP response packet based on the ARP request. The ARP response packet carries a MAC address that is of an uplink port of the virtual bridge and that is used as a destination MAC address of a to-be-sent data packet.

According to a fourth aspect, corresponding to the foregoing apparatus, method, and system, an embodiment of the present application provides a host. The host has a function of implementing the host defined in the first aspect. The function may be implemented by hardware, or may be implemented by executing corresponding software by hardware. The hardware or software includes one or more modules corresponding to the foregoing function. Specifically, the host includes a first processor, a first memory, and at least one network interface card. The network interface card includes a second processor, a second memory, and at least two network ports. A first network port supports a network interface card virtualization capability. The first network port is corresponding to at least one PF and multiple VFs. The first virtual machine is connected to at least one VF of the first network port. The first memory and the second memory store instructions.

The first processor is configured to execute an instruction in the first memory to implement functions of the first virtual machine, the virtual bridge, and the virtual network function module in the first aspect.

The second processor is configured to execute an instruction in the second memory to implement a function of the switching equipment in the first aspect.

In a possible design, the host and an SDN controller are implemented by a general-purpose or dedicated server. The server includes a processor, a memory, a system bus, and an input/output interface. The processor is configured to support a corresponding function of the host in the system. The input/output interface is configured to communicate with another component in the cloud computing system. The processor executes the instructions stored in the memories.

According to a fifth aspect, an embodiment of the present application provides a computer storage medium that is configured to store a computer software instruction used by the foregoing host. The computer software instruction includes a program designed for executing the foregoing aspects.

According to a sixth aspect, an embodiment of the present application provides another computer storage medium that is configured to store a computer software instruction used by the switching equipment in the foregoing network interface card. The computer software instruction includes a program designed for executing the foregoing aspects.

According to a seventh aspect, an embodiment of the present application provides a computer program. When a physical server runs the computer program, the physical server performs functions of a virtual machine, a virtual bridge, and a virtual network function module in a host.

According to an eighth aspect, an embodiment of the present application provides a computer program. When a processor or a programmable logic circuit in a network interface card runs the computer program, the network interface card performs a function of the switching equipment in the foregoing aspects.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following description merely show some embodiments of the present application, and a person of ordinary skill in the art can derive other implementations from these accompanying drawings without creative efforts. All these embodiments or implementations fall within the protection scope of the present application.

DESCRIPTION OF EMBODIMENTS

A network architecture and a service scenario that are described in the embodiments of the present application are used to describe the technical solutions in the embodiments of the present application more clearly, and do not constitute any limitation on the technical solutions provided in the embodiments of the present application. A person of ordinary skill in the art may learn that, with the evolution of network architectures and the emergence of a new service scenario, the technical solutions provided in the embodiments of the present application are also applicable for similar technical issues.

Figure 1A:
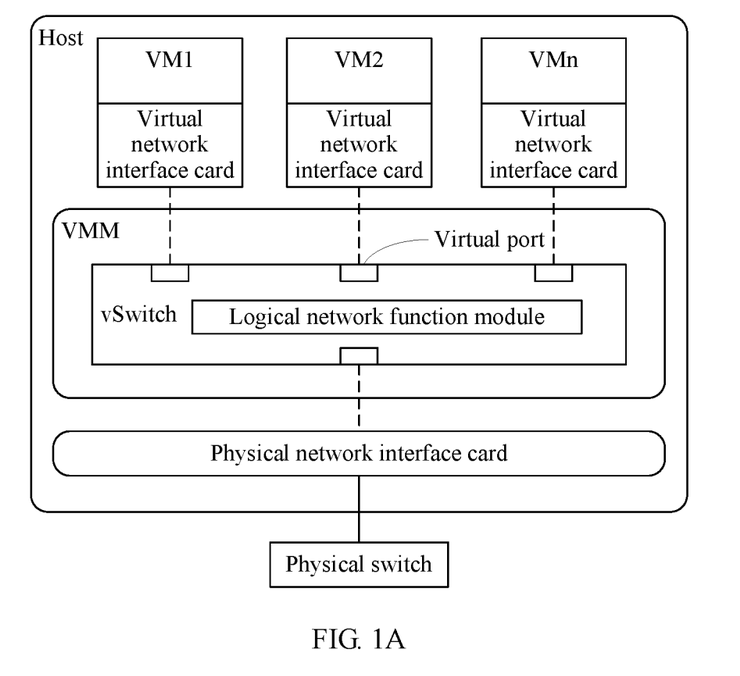
FIG. 1A is a schematic diagram of a virtualized structure on a host according to an embodiment of the present application.

As shown in FIG. 1A, FIG. 1A is a schematic diagram of a virtualized structure on a host according to an embodiment of the present application. The host is a physical server. A bottom layer of the physical server is a hardware layer. The hardware layer mainly includes hardware resources such as a central processing unit (CPU), a memory, a hard disk, and a network interface card. Server virtualization implements a virtualized running environment of multiple virtual machines (VM) on the physical server by using virtualization software (for example, VMWare ESX or Citrix XEN). A software layer that is installed on the server to implement a virtualized environment is referred to as a virtual machine monitor (VMM). The VMM running on the hardware layer is responsible for scheduling, allocating, and managing the hardware resources at the hardware layer. Multiple virtual machines VMs run on the VMM. The VMM provides each virtual machine with a hardware environment such as a virtualized CPU, memory, storage, IO device (such as a network interface card), and Ethernet switch, to ensure that the multiple virtual machines run in a manner of isolating from each other.

In a virtualized running environment, the VMM creates a virtual network interface card (vNIC) for each virtual machine, and a virtual switch vSwitch provides a capability of communication between the virtual machines and between the virtual machines and an external network. The virtual network interface card of each virtual machine is corresponding to a logical port of the vSwitch. A physical network interface card of the host is corresponding to a port connecting the vSwitch to an external physical switch. When a data packet sent or received by a virtual machine passes through the VMM, a virtual network function module on the VMM performs network function processing on the data packet that passes through the VMM. The virtual network function module is a software module and can be updated as required. Therefore, the virtual network function module on the VMM can provide abundant network functions for a user.

A network port of the physical network interface card supports a virtualization capability. This can be implemented by means of single-root input/output virtualization (SR-IOV) or multi-root input/output virtualization (MR-IOV). In this embodiment of the present application, an SR-IOV technology is used as an example for description. The SR-IOV technology is a hardware-based virtualization solution. A peripheral component interconnect express (PCIe) device can be efficiently shared between virtual machines. In addition, the SR-IOV technology is implemented in hardware, so that efficient I/O performance can be obtained.

The standardization organization Peripheral Component Interconnect Special Interest Group (PCI-SIG) defines an SR-IOV specification. For the SR-IOV specification, refer to http://www.pcisig.com.

By using the SR-IOV technology, a single I/O resource may be shared by the multiple virtual machines on the host. In this way, each virtual machine can access a same hardware resource. Therefore, a PCIe device with SR-IOV enabled (for example, the network port of the physical network interface card) may be displayed as multiple separate devices. Each separate device that is displayed has independent PCIe configuration space. A physical network interface card supporting SR-IOV is used as an example. The physical network interface card includes network ports, and can enable/disable an SR-IOV capability for each network port. A network port for which the SR-IOV capability is enabled is corresponding to at least one physical function (PF) and multiple virtual functions (VF). According to an existing SR-IOV specification, each PF may have a maximum of 64,000 VFs that are associated with the PF. After a VF is created, the VF may be directly assigned to a virtual machine on the host for use, so that the multiple virtual machines share the PCIe device by using at least one VF that is connected to the multiple virtual machines.

Figure 1B:
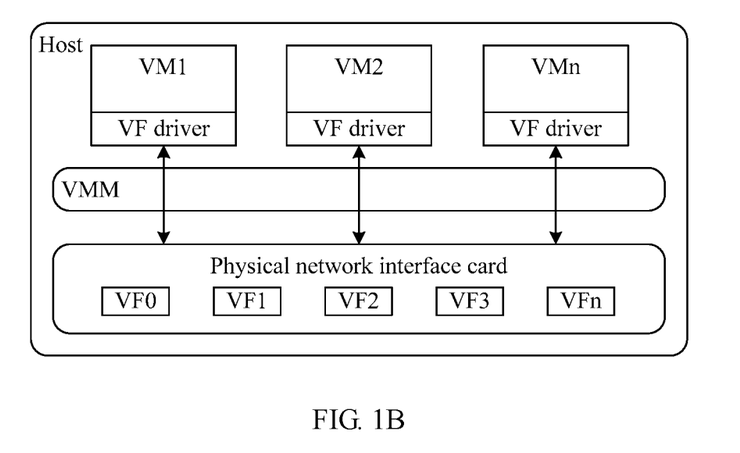
FIG. 1B is a schematic diagram of a virtualized structure on a host in a network interface card passthrough scenario according to an embodiment of the present application.

As shown in FIG. 1B, FIG. 1B is a schematic diagram of a virtualized structure on a host in a network interface card passthrough scenario according to an embodiment of the present application. A difference between FIG. 1A and FIG. 1B lies in that: A physical network interface card supports single-root IO virtualization, a network port of the physical network interface card is corresponding to at least one PF and multiple VFs, and the VFs can share a physical resource of the physical network interface card (for example, a port of the network interface card).

When a virtual machine on the host sends a data packet by using a passthrough VF, the data packet sent by the virtual machine is directly transferred to the VF of the network interface card by using a VF driver installed on the virtual machine. As a result, the data packet cannot pass through a virtual network function module on a VMM. Switching equipment of the network interface card has a limited MAC table capacity and a limited processing capability, and cannot perform unconstrained function extension. Therefore, the network interface card cannot provide abundant network functions. In a possible scenario, the switching equipment is a virtual Ethernet bridge & classifier.

It should be noted that this embodiment of the present application is based on the network interface card passthrough scenario. The foregoing network interface card passthrough may be implemented by means of SR-IOV or MR-IOV, and this embodiment of the present application imposes no limitation thereon.

Figure 2:
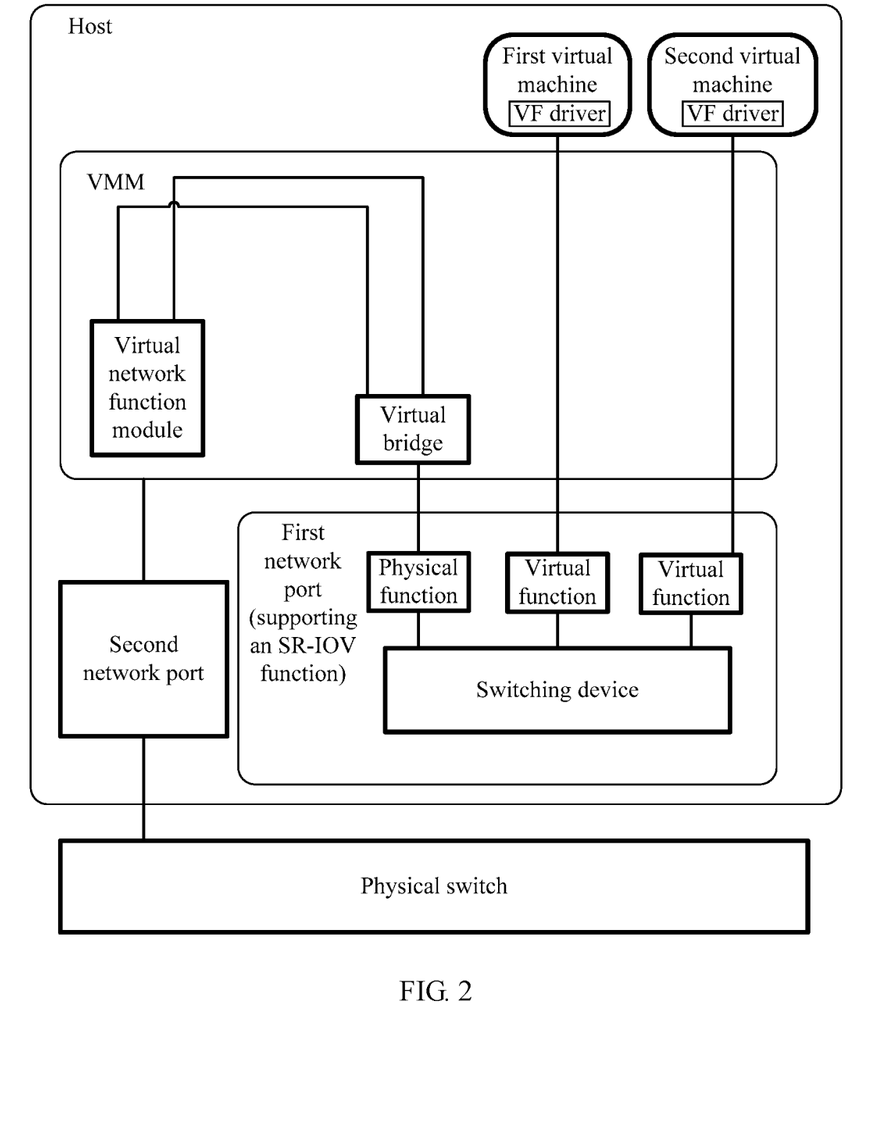
FIG. 2 is a schematic diagram of another virtualized architecture on a host according to an embodiment of the present application.

As shown in FIG. 2, FIG. 2 is a schematic diagram of another virtualized architecture on a host according to an embodiment of the present application. The host includes a virtual machine monitor VMM and at least one physical network interface card. At least one virtual machine runs on the host. The at least one physical network interface card includes at least two network ports: a first network port and a second network port. The first network port supports a network interface card virtualization capability, and the second network port is connected to an external physical switch of the host. The first network port is virtualized into at least one PF and at least two VFs (in FIG. 2, two VFs are used as an example for description). A VF driver is installed on a first virtual machine and a second virtual machine. The first virtual machine and the second virtual machine are separately connected to at least one VF. The PF is connected to a virtual bridge on the VMM. The virtual bridge is connected to a virtual network function module on the VMM, and the virtual network function module is connected to the external physical switch of the host by using the second network port.

In a specific scenario, the virtual bridge on the VMM may be an Open vSwitch bridge, and the PF of the first network port serves as an uplink port of the virtual bridge. It should be noted that a VF of the first network port may be alternatively selected as the uplink port of the virtual bridge, that is, the first network port is connected to the virtual bridge on the VMM by using the selected VF. In this case, a VF driver needs to be loaded on the VMM, and the VF that is connected to the virtual bridge needs to be set to a promiscuous mode. Similar to the PF, the VF that is set to the promiscuous mode can receive a data packet whose destination address is not a MAC address of the VF. For specific description about the promiscuous mode, refer to https://en.wikipedia.org/wiki/Promiscuous mode. In the embodiments of the present application, an example in which the PF of the first network port is connected to the virtual bridge is used for description. A person skilled in the art may understand that, in the foregoing setting manner, the VF in the promiscuous mode may also be used to connect to the virtual bridge.

In a possible implementation, the first network port and the second network port may be located on a same network interface card, or may be independently located on different network interface cards. This embodiment of the present application imposes no limitation thereon.

In the embodiments of the present application, network interface card virtualization may be specifically hardware virtualization of a network interface card.

The first virtual machine and the second virtual machine are separately connected to at least one VF of the first network port. Different virtual local area network (VLAN) identifiers are set for VFs of the first network port. A VLAN is a broadcast domain. Therefore, a broadcast packet can be sent only to a virtual machine on a VLAN. Therefore, different VLAN identifiers are set for VFs, so that virtual machines are located in different broadcast domains and a broadcast packet sent by the virtual machine can be received only by the virtual machine itself and a PF. During setting of a VLAN identifier for a VF, it needs to be ensured that the VLAN identifier is unique within a host range. VLAN identifiers on different hosts may be the same.

It should be noted that, in the embodiment shown in FIG. 2, sending a data packet to the second virtual machine by the first virtual machine is communication between two virtual machines within a same host. A person skilled in the art may understand that the second virtual machine and the first virtual machine may be alternatively located on different hosts. In this case, the first virtual machine communicates with the second virtual machine in a cross-host manner. In FIG. 2, only two VFs and two VLAN subinterfaces are used as an example for description. In an actual product implementation, a network interface card supporting a network interface card virtualization function may be virtualized into at least one PF and multiple VFs. A quantity of VFs is not limited to two, and correspondingly, a quantity of VLAN subinterfaces is not limited to two, either.

In this embodiment of the present application, an example in which a VM1 (the first virtual machine) sends a data packet to a VM2 (the second virtual machine) is used as an example to describe a data packet processing process. Switching equipment in the network interface card needs to send, to the virtual network function module on the VMM, the data packet from the VM1 for processing. Before sending the data packet, the first virtual machine determines that a destination media access control MAC address of the to-be-sent data packet is a MAC address of the uplink port of the virtual bridge on the VMM. The first virtual machine sends the data packet to the second virtual machine by using the VF that is connected to the first virtual machine. A destination IP address carried in the data packet is an IP address of the second virtual machine, and the destination MAC address carried in the data packet is the MAC address of the uplink port of the virtual bridge. The switching equipment of the first network port receives the data packet that is sent by the first virtual machine by using the VF, and performs layer 2 forwarding on the data packet according to the destination MAC address of the data packet to send the data packet to the virtual bridge by using the uplink port of the virtual bridge. The virtual bridge receives the data packet, changes the destination MAC address of the data packet to a MAC address of the second virtual machine, and sends a changed data packet to the virtual network function module. The destination MAC address of the data packet is changed, so that the changed MAC address may be used in a subsequent transmission process of data packet. This ensures that the data packet can be sent to the second virtual machine. After receiving the changed data packet, the virtual network function module performs network function processing on the changed data packet to provide abundant network function services for a user, and then sends the processed data packet to the second virtual machine according to the MAC address of the second virtual machine.

In this embodiment of the present application, a virtual machine sends a data packet from a VF that is connected to the virtual machine. Switching equipment of a first network port forwards the data packet, and sends the data packet to a virtual bridge on a VMM. The virtual bridge transfers the data packet to a virtual network function module. The virtual network function module provides abundant network functions for the data packet. In a network interface card passthrough scenario, after sending a data packet from a passthrough VF, a virtual machine may send the data packet to a virtual network function module on a VMM in the foregoing manner. The software module is used to provide abundant network functions for a user, so as to perform virtual network function processing on the data packet.

Further, an embodiment of the present application provides an Address Resolution Protocol (ARP) process, so that, before sending the data packet, the first virtual machine may obtain the MAC address of the uplink port of the virtual bridge, and set the destination MAC address of the data packet to the MAC address of the uplink port of the virtual bridge. In the ARP process provided in this embodiment of the present application, a software-defined networking (SDN) controller performs pickup for an ARP request initiated by the VM1, adds the MAC address of the uplink port of the virtual bridge on the VMM to an ARP response, and directs, to the PF or VF that is connected to the virtual bridge and by allowing the MAC address to be corresponding to a destination IP address of the data packet, the data packet sent by the VM1. It should be noted that the SDN controller may obtain a network topology of a cloud computing network, that is, may implement the foregoing ARP process.

Figure 3:
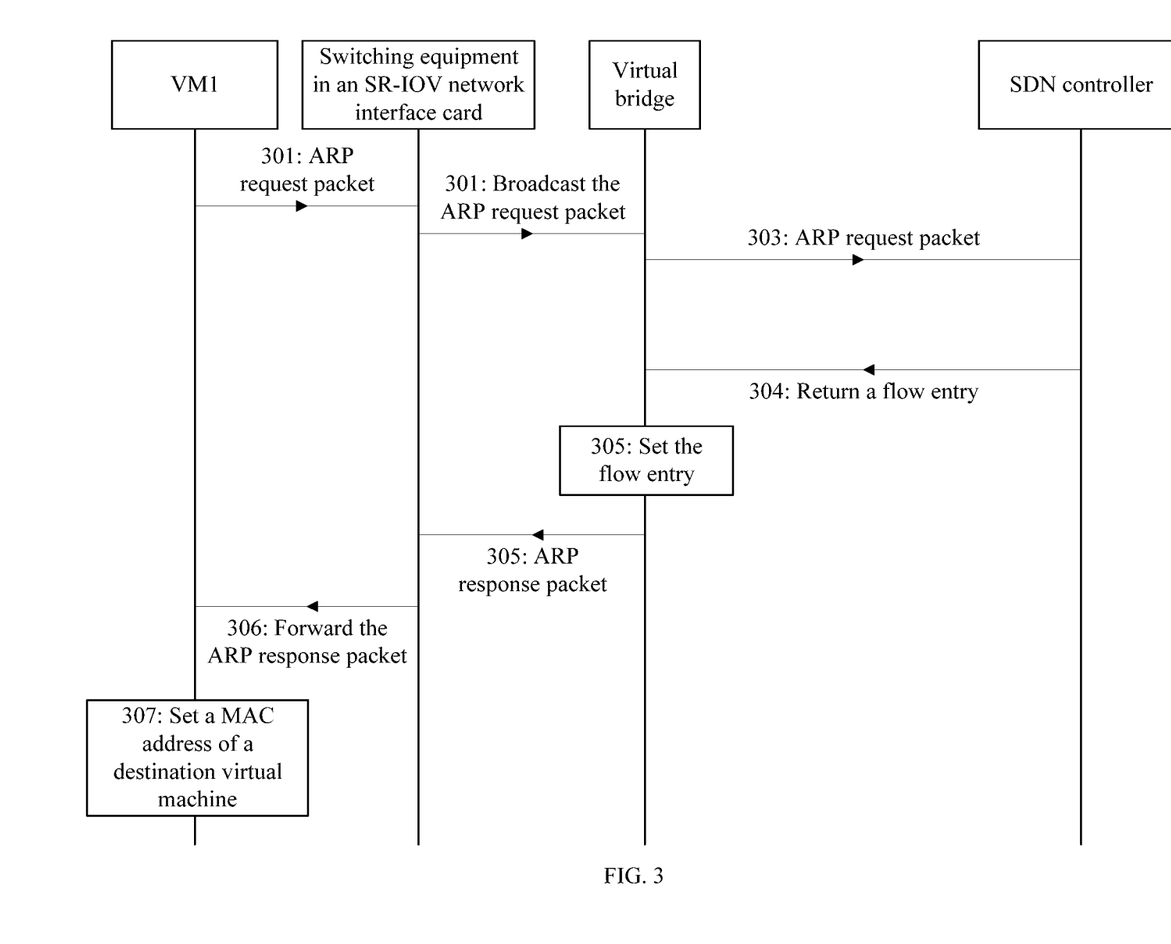
FIG. 3 is a schematic diagram of an ARP process according to an embodiment of the present application.

Specifically, as shown in FIG. 3, FIG. 3 is a schematic diagram of an ARP process according to an embodiment of the present application.

Step 301: A VM1 sends an ARP request packet that carries an IP address of a VM2 and that is used to obtain a MAC address of the VM2. The ARP request packet is sent from a VF that is connected to the VM1. Switching equipment on a network interface card receives the ARP request packet. The ARP request packet carries a VLAN identifier of the VF that sends the ARP request packet.

Step 302: The switching equipment broadcasts the ARP request packet. Because VFs connected to each virtual machine on a host have different VLAN identifiers, the ARP request packet is sent to a virtual bridge by using a PF.

In a possible design, when the virtual bridge is connected to the network interface card by using a VF, the ARP request packet is sent to the virtual bridge by using the AF.

Step 303: The virtual bridge forwards the ARP request packet to an SDN controller.

Specifically, the virtual bridge may send the ARP request packet to the SDN controller by using a packet-in message.

Step 304: The SDN controller sets a flow entry for the virtual bridge, and delivers the flow entry to the virtual bridge.

The flow entry includes:

(1) an ARP pickup setting: the ARP pickup setting indicates that when receiving the ARP packet request that is sent by the VM1 and that is used to obtain the MAC address of the VM2, the virtual bridge constructs an ARP response packet, where the ARP response packet carries a MAC address that is of an uplink port of the virtual bridge and that is used as the MAC address of the VM2, and the MAC address of the uplink port of the virtual bridge is a MAC address of a PF or the VF that is connected to the virtual bridge;

(2) a VLAN identifier processing setting: for a unicast packet sent by the VM1, a VLAN identifier carried in the unicast packet is removed; and (3) a MAC address setting: for a unicast packet sent to the VM2 by the VM1, a destination MAC address of the unicast packet is changed to the MAC address of the VM2, and a changed unicast packet is sent to a virtual network function module by using a port connected to the virtual network function module.

It should be noted that a setting principle of the foregoing flow entry may be based on the OpenFlow protocol.

Step 305: The virtual bridge configures the flow entry, returns an ARP response packet to the VM1 according to an ARP pickup setting, where the ARP response packet carries a MAC address of an uplink port of the virtual bridge; and sends the ARP response packet to the switching equipment by using the uplink port.

Step 306: The switching equipment forwards the ARP response packet to the VM1.

Step 307: The VM1 receives the ARP response packet, and sets the MAC address of the VM2 to the MAC address of the uplink port of the virtual bridge.

In this embodiment of the present application, the foregoing ARP process is defined, so that layer 2 forwarding control of VM traffic is implemented without auto-learning of a MAC forwarding table. According to the foregoing ARP process, a destination MAC address of a data packet sent by the VM1 is the MAC address of the uplink port of the virtual bridge. This ensures that the data packet is sent to the virtual bridge by using the uplink port. Then the virtual bridge forwards the data packet to the virtual network function module for processing.

Figure 4:
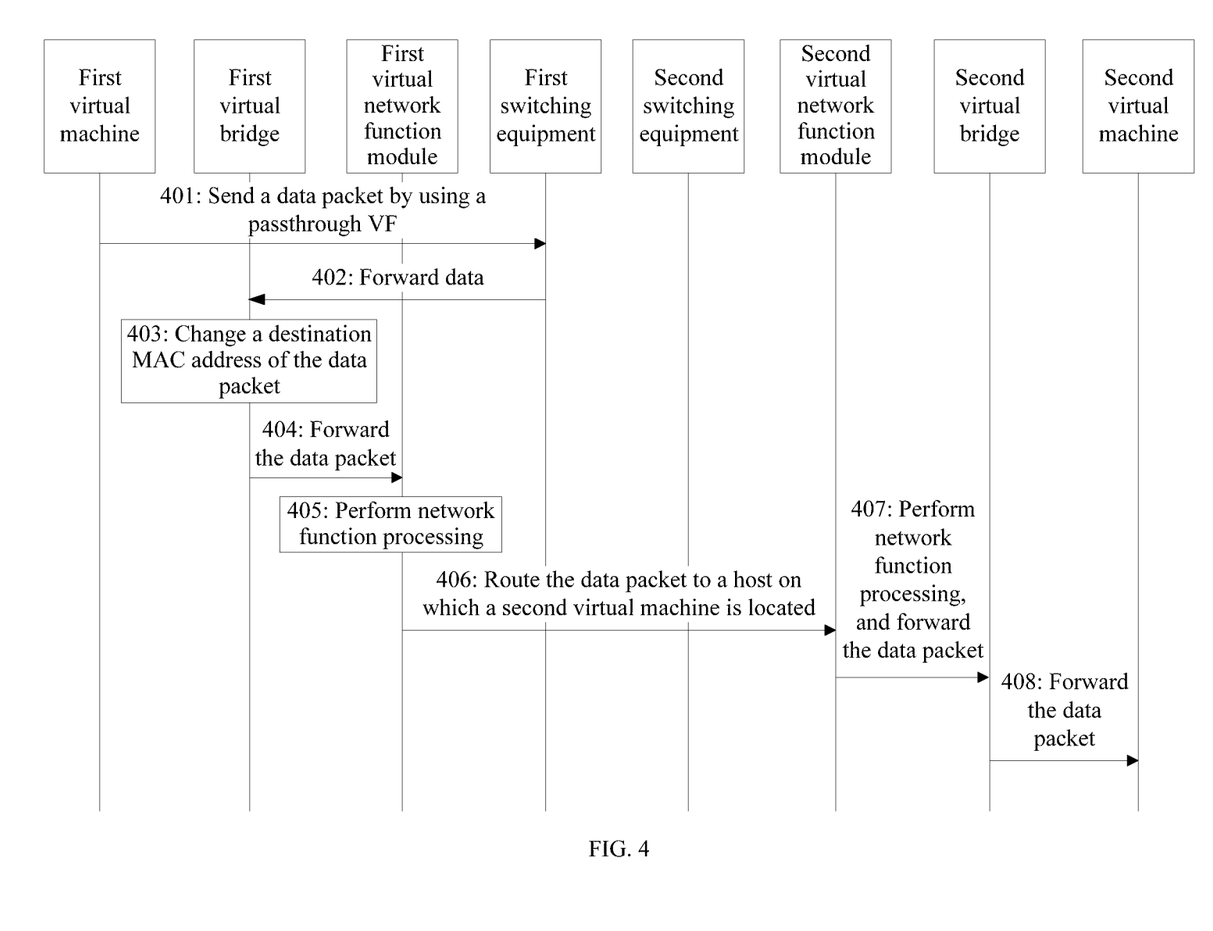
FIG. 4 is a schematic flowchart of sending a data packet to a VM2 by a VM1 according to an embodiment of the present application.

Referring to FIG. 4, FIG. 4 is a schematic flowchart of sending a data packet to a VM2 by a VM1 according to an embodiment of the present application. In this embodiment of the present application, a VM1 on a host 1 sends a data packet to a VM2 on a host 2. A VMM of the host 1 includes a first virtual bridge and a first virtual network function module. A network interface card of the host 1 includes at least two network ports and first switching equipment. A VMM of the host 2 includes a second virtual bridge and a second virtual network function module. A network interface card of the host 2 includes at least two network ports and second switching equipment. Specifically, structures of the host 1 and the host 2 and functions of the components are shown in FIG. 2. Details are not described herein again. A process of sending the data packet to the VM2 by the VM1 includes:

Step 401: The VM1 sends, by using a VF that is connected to the VM1, the data packet whose destination is the VM2. A destination IP address of the data packet is an IP address of the VM2, and a destination MAC address of the data packet is a MAC address of an uplink port of the first virtual bridge on the host 1. The data packet carries a VLAN identifier of the VF.

Step 402: The first switching equipment of the network interface card of the host 1 receives the data packet, and sends the data packet to the first virtual bridge according to the destination MAC address of the data packet by using the uplink port.

Step 403: The first virtual bridge processes the data packet according to a preset flow entry, removes the VLAN identifier in the data packet, and changes the destination MAC address of the data packet to a MAC address of the VM2.

Step 404: The first virtual bridge sends a changed data packet to the first virtual network function module.

Step 405: The first virtual network function module performs network function processing on the data packet, including a security group, QoS, layer 2 tunnel encapsulation, distributed routing, and the like.

It should be noted that the first virtual network function module may perform network function processing by using various implementations in the prior art. This embodiment of the present application imposes no limitation thereon.

Step 406: The first virtual network function module sends the processed data packet to an external physical switch of the host 1 by using a second network port, and the physical switch routes, through a network, the data packet to the host 2 on which the VM2 is located.

It should be noted that the data packet carries the IP address and the MAC address of the VM2 and the data packet may be routed, in an existing routing manner, to the host 2 on which the VM2 is located. This embodiment of the present application does not limit a transmission process of the data packet on the network. For example, a tunnel may be established between the host 1 on which the VM1 is located and the host 2 on which the VM2 is located, and endpoints of the tunnel are respectively the virtual network function module of the host 1 and that of the host 2, so that the tunnel required for data transmission is established between the two hosts for the VM1 and the VM2.

Step 407: The second virtual network function module of the host 2 on which the VM2 is located performs network function processing on the received data packet, and sends the processed data packet to the second virtual bridge.

Step 408: The second virtual bridge performs layer 2 forwarding according to the MAC address of the VM2, and sends, by using the second switching equipment, the data packet to a VF that is connected to the VM2, so as to send the data packet to the VM2.

For a data packet that is sent from an exterior of a host to a destination virtual machine on the host, the data packet is first transferred from a second network port to a virtual network function module; and then after having undergone virtual network function processing, the data packet is transferred to the destination virtual machine of the data packet by using a first network port.

The embodiment shown in FIG. 4 describes cross-host communication between virtual machines. It may be understood that a source virtual machine and a destination virtual machine of a data packet may be located on a same host. In this case, a data packet transmission process is similar to the process in FIG. 4. A difference lies in that: when the source virtual machine and the destination virtual machine of the data packet are located on a same host, a virtual network function module of the host sends the processed data packet to a virtual bridge after completing network function processing, and the virtual bridge sends the processed data packet to the destination virtual machine according to a MAC address of the destination virtual machine.

Figure 5:
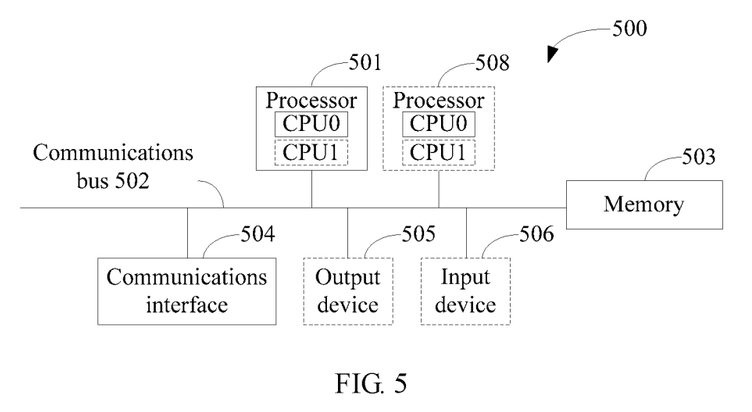
FIG. 5 is a schematic structural diagram of hardware of a computer device according to an embodiment of the present application.

The host and an SDN controller may use a general-purpose computer device. For example, as shown in FIG. 5, FIG. 5 is a schematic structural diagram of hardware of a computer device according to an embodiment of the present application. The computer device 500 includes at least one processor 501, a communications bus 502, a memory 503, and at least one communications interface 504.

The processor 501 may be a general-purpose central processing unit (CPU), a microprocessor, an application-specific integrated circuit (ASIC), or one or more integrated circuits configured to control program execution in the solutions of the present application.

The communications bus 502 may include a path for transferring information between the foregoing components. The communications interface 504 uses an apparatus such as a transceiver to communicate with another device or a communications network such as an Ethernet, a radio access network (RAN), or a wireless local area network (WLAN).

The memory 503 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. No limitation is imposed thereon. The memory may exist alone and is connected to the processor by using the bus. Alternatively, the memory may be integrated with the processor.

The memory 503 is configured to store application program code for executing the solutions in the present application, and the processor 501 controls the execution. The processor 501 is configured to execute the application program code stored in the memory 503.

In a specific implementation, in an embodiment, the processor 501 may include one or more CPUs, for example, a CPU0 and a CPU1 in FIG. 5.

In a specific implementation, in an embodiment, the computer device 500 may include multiple processors, for example, the processor 501 and a processor 508 in FIG. 5. Each of the processors may be a single-core processor, or may be a multi-core processor. The processor herein may be one or more devices, circuits, and/or processing cores that are configured to process data (for example, a computer program instruction).

In a specific implementation, in an embodiment, the computer device 500 may further include an output device 505 and an input device 506. The output device 505 communicates with the processor 501, and can display information in multiple manners. For example, the output device 505 may be a liquid crystal display (LCD), a light emitting diode (LED) display device, a cathode ray tube (CRT) display device, a projector, or the like. The input device 506 communicates with the processor 501, and may receive a user input in multiple manners. For example, the input device 506 may be a mouse, a keyboard, a touchscreen device, a sensing device, or the like.

The computer device 500 may be a general-purpose computer device or a dedicated computer device. In a specific implementation, the computer device 500 may be a desktop computer, a portable computer, a network server, a personal digital assistant (PDA), a mobile phone, a tablet computer, a wireless terminal device, a communications device, an embedded device, or a device with a structure similar to the structure in FIG. 5. This embodiment of the present application imposes no limitation on a type of the computer device 500.

The SDN controller and the host in FIG. 2 may be the device shown in FIG. 5. The memory stores one or more software modules for implementing functions of the host and the SDN controller. The host and the SDN controller may implement, by using the processor and the program code in the memory, the packet processing method disclosed in the embodiments of the present application.

It should be noted that the computer device shown in FIG. 5 only provides possible hardware implementations of parts in a cloud computing system. According to differences or variations of functions of the parts in the system, hardware components of the computer device may be added or deleted to match the functions of the parts in the system.

Further, similar to the hardware apparatus shown in FIG. 5, the network interface card in the foregoing embodiments includes a processor and a memory. The processor in the network interface card executes an instruction in the memory to implement a function of the foregoing switching equipment. Details are not described again in this embodiment of the present application.

Figure 6:
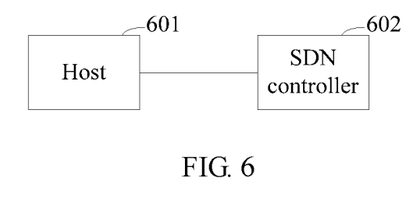
FIG. 6 is a schematic structural diagram of a cloud computing system according to an embodiment of the present application.

Still further, as shown in FIG. 6, FIG. 6 is a schematic structural diagram of a cloud computing system according to an embodiment of the present application. The cloud computing system includes at least one host 601 and an SDN controller 602. The host includes at least one network interface card. A structure of the host is shown in FIG. 2.

The host 601 includes a virtual machine monitor VMM and at least one network interface card. A first virtual machine runs on the host 601. The VMM includes a virtual bridge and a virtual network function module. The network interface card includes switching equipment and at least two network ports. A first network port supports single-root input/output virtualization. The first network port is corresponding to at least one PF and multiple VFs. The first virtual machine is connected to at least one VF of the first network port.

The SDN controller 602 is configured to receive an ARP request packet from the first virtual machine that is forwarded by the virtual bridge, and return a flow entry to the virtual bridge. The flow entry includes an ARP pickup setting and a MAC address setting. The ARP pickup setting is used to instruct the virtual bridge to construct an ARP response packet for the first virtual machine. The ARP response packet carries a MAC address that is of an uplink port of the virtual bridge and that is used as a destination MAC address of a to-be-sent data packet.

The first virtual machine is configured to send the data packet to a second virtual machine by using the VF that is connected to the first virtual machine. A destination IP address carried in the data packet is an IP address of the second virtual machine, and the destination MAC address carried in the data packet is the MAC address of the uplink port of the virtual bridge.

The switching equipment is configured to receive the data packet, and send the data packet to the virtual bridge according to the destination MAC address of the data packet by using the uplink port of the virtual bridge.

The virtual bridge is configured to receive the data packet, change the destination MAC address of the data packet to a MAC address of the second virtual machine, and send a changed data packet to the virtual network function module.

The virtual network function module is configured to perform network function processing on the changed data packet, and send the processed data packet to the second virtual machine according to the MAC address of the second virtual machine.

The multiple VFs of the first network port have different virtual local area network VLAN identifiers.

The first virtual machine is further configured to send the ARP request packet by using the VF that is connected to the first virtual machine. The ARP request packet carries a VLAN identifier of the VF that sends the ARP request packet.

The switching equipment is further configured to broadcast the ARP request packet. The ARP request packet is sent to the virtual bridge by using the uplink port.

The virtual bridge is further configured to forward the ARP request packet to the SDN controller, receive the flow entry returned by the SDN controller, and return the ARP response packet to the first virtual machine. The ARP response packet carries the MAC address that is of the uplink port of the virtual bridge and that is used as the destination MAC address of the to-be-sent data packet.

The flow entry further includes a MAC address setting. The MAC address setting is used to instruct the virtual bridge to change a destination MAC address of a unicast packet to the MAC address of the second virtual machine when the virtual bridge receives the unicast packet that is sent by the first virtual machine to the second virtual machine.

Further, the flow entry further includes an output setting. The output setting is used to instruct to send the changed data packet by using a port that is connected to the virtual network function module.

The uplink port of the virtual bridge is a PF of the first network port, and the virtual bridge is connected to the network interface card by using the PF; or the uplink port of the virtual bridge is a selected VF of the first network port, and the virtual bridge is connected to the network interface card by using the selected VF, where the selected VF that is connected to the virtual bridge is set to a promiscuous mode.

When the second virtual machine and the first virtual machine run on a same host, the virtual bridge is further configured to receive the processed data packet, and send the processed data packet to the second virtual machine according to the destination MAC address of the data packet by using the switching equipment.

When the second virtual machine and the first virtual machine run on different hosts, a tunnel is established between a virtual network function module of a host on which the first virtual machine is located and a virtual network function module of a host on which the second virtual machine is located. The processed data packet is transmitted from a second network port to the virtual network function module of the host on which the second virtual machine is located. After completing network function processing on the data packet, the virtual network function module of the host on which the second virtual machine is located sends the data packet to the second virtual machine by using a virtual bridge of the host on which the second virtual machine is located.

An embodiment of the present application further provides a computer storage medium that is configured to store a computer software instruction used by the devices in FIG. 2 to FIG. 6. The computer software instruction includes a program designed for executing the foregoing method embodiments. A packet processing method in a cloud computing system may be implemented by executing a stored program.

In conclusion, according to the packet processing method in a cloud computing system, the host, and the system that are provided in the embodiments of the present application, a packet sent by a virtual machine that uses a passthrough VF can be directed to a virtual bridge on a VMM, and further a virtual network function module on the VMM performs network function processing on the data packet, so as to provide abundant network functions for a user.

Although the present application is described with reference to the embodiments, in a process of implementing the embodiments of the present application that claims protection, a person skilled in the art may understand and implement another variation of the disclosed embodiments by viewing the accompanying drawings, disclosed content, and the accompanying claims. In the claims, the word "comprising" does not exclude other constituent parts or steps. A single processor or another unit may implement several functions enumerated in the claims. Some measures are recorded in dependent claims that are different from each other, but this does not mean that these measures cannot be combined to produce a better effect.

A person skilled in the art should understand that the embodiments of the present application may be provided as a method, an apparatus (device), or a computer program product. Therefore, the present application may use a form of hardware only embodiments, software only embodiments, or embodiments with a combination of software and hardware. Moreover, the embodiments of the present application may use a form of a computer program product that is implemented on one or more computer-usable storage media (including but not limited to a disk memory, a CD-ROM, an optical memory, and the like) that include computer-usable program code. The computer program is stored/distributed in a proper medium and is provided as or used as a part of the hardware together with another hardware, or may also use another allocation form, such as by using the Internet or another wired or wireless telecommunications system.

The computer program instructions in the embodiments of the present application may be stored in a computer readable memory that can instruct a computer or another programmable data processing device to work in a specific manner. The computer program instructions may be executed to implement functions of components in the foregoing embodiments.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present application is described with reference to specific features and the embodiments thereof, obviously, various modifications and combinations may be made to them without departing from the spirit and scope of the present application. Correspondingly, the specification and accompanying drawings are merely illustrative description of the present application defined by the accompanying claims, and are considered as any of or all modifications, variations, combinations or equivalents that cover the scope of the present application. Obviously, a person skilled in the art can make various modifications and variations to the present application without departing from the spirit and scope of the present application. The present application is intended to cover these modifications and variations provided that they fall within the scope of protection defined by the following claims and their equivalent technologies.

What is claimed is:

1. A host, comprising:
    a virtual machine monitor (VMM) comprising a virtual bridge and a virtual network function module;
    at least one network interface card comprising switching equipment and a first network port, wherein the first network port supports a network interface card virtualization capability and the first network port corresponds to at least one physical function (PF) and multiple virtual functions (VFs);
    a first virtual machine connected to at least one VF of the first network port and configured to:
        determine a destination media access control (MAC) address of a data packet to be sent, wherein the destination MAC address of the data packet is a MAC address of an uplink port of the virtual bridge, and
        send the data packet to a second virtual machine by using the VF connected to the first virtual machine, wherein a destination IP address carried in the data packet is an IP address of the second virtual machine, and the destination MAC address carried in the data packet is the MAC address of the uplink port of the virtual bridge;
    wherein the switching equipment is configured to receive the data packet, and send the data packet to the virtual bridge according to the destination MAC address of the data packet by using the uplink port of the virtual bridge;
    wherein the virtual bridge is configured to receive the data packet, change the destination MAC address of the data packet to a MAC address of the second virtual machine, and send a changed data packet to the virtual network function module; and
    wherein the virtual network function module is configured to perform network function processing on the changed data packet, and send a processed data packet, wherein a destination MAC address of the processed data packet is the MAC address of the second virtual machine.

2. The host according to claim 1, wherein the multiple VFs of the first network port have different virtual local area network (VLAN) identifiers.

3. The host according to claim 2, wherein:
    the first virtual machine is further configured to send an Address Resolution Protocol (ARP) request packet by using the VF that is connected to the first virtual machine, wherein the ARP request packet carries a VLAN identifier of the VF that sends the ARP request packet;
    the switching equipment is further configured to broadcast the ARP request packet, wherein the ARP request packet is sent to the virtual bridge by using the uplink port;

the virtual bridge is further configured to forward the ARP request packet to a software-defined networking (SDN) controller, and receive a flow entry returned by the SDN controller, wherein the flow entry comprises an ARP pickup setting for instructing the virtual bridge to construct an ARP response packet based on the ARP request packet, and the ARP response packet carries the MAC address of the uplink port of the virtual bridge that is used as the destination MAC address of the data packet; and the virtual bridge is further configured to return the ARP response packet to the first virtual machine, wherein the ARP response packet carries the MAC address of the uplink port of the virtual bridge that is used as the destination MAC address of the data packet.

4. The host according to claim 3, wherein the flow entry further comprises a MAC address setting for instructing the virtual bridge to change the destination MAC address of the data packet to the MAC address of the second virtual machine when the virtual bridge receives the data packet that is sent by the first virtual machine to the second virtual machine.

5. The host according to claim 1, wherein:
the uplink port of the virtual bridge is a PF of the first network port, and the virtual bridge is connected to the network interface card by using the PF; or
the uplink port of the virtual bridge is a selected VF of the first network port, and the virtual bridge is connected to the network interface card by using the selected VF, wherein the selected VF that is connected to the virtual bridge is set to a promiscuous mode.

6. The host according to claim 1, wherein:
the second virtual machine and the first virtual machine run on the host; and
the virtual bridge is further configured to receive the processed data packet, and send the processed data packet to the second virtual machine according to the destination MAC address of the processed data packet by using the switching equipment.

7. The host according to claim 1, wherein:
the second virtual machine and the first virtual machine run on different hosts; and
the virtual network function module is configured to establish a tunnel between the virtual network function module and a second virtual network function module on a host on which the second virtual machine is located, send the processed data packet to a second network port of the network interface card, and send, by using the tunnel, the processed data packet to the host on which the second virtual machine is located enabling the second virtual network function module to send the processed data packet to the second virtual machine.

8. A packet processing method in a cloud computing system comprising at least one host comprising a virtual machine monitor (VMM) including a virtual bridge and a virtual network function module, and at least one network interface card including switching equipment and a first network port, wherein the first network port supports a network interface card virtualization capability, the first network port corresponds to at least one physical function (PF) and multiple virtual functions (VFs), and a first virtual machine is connected to at least one VF of the first network port, the method comprising:
determining, by the first virtual machine, a destination MAC address of a data packet to be sent, wherein the MAC address of the data packet is a MAC address of an uplink port of the virtual bridge;

sending, by the first virtual machine, the data packet to a second virtual machine by using the VF connected to the first virtual machine, wherein a destination IP address carried in the data packet is an IP address of the second virtual machine, and the destination MAC address carried in the data packet is the MAC address of the uplink port of the virtual bridge;

receiving, by the switching equipment, the data packet, and sending the data packet to the virtual bridge according to the destination MAC address of the data packet by using the uplink port of the virtual bridge;

receiving, by the virtual bridge, the data packet, changing the destination MAC address of the data packet to a MAC address of the second virtual machine, and sending a changed data packet to the virtual network function module; and performing, by the virtual network function module, network function processing on the changed data packet, and sending a processed data packet, wherein a destination MAC address of the processed data packet is the MAC address of the second virtual machine.

9. The method according to claim 8, wherein the multiple VFs of the first network port have different virtual local area network (VLAN) identifiers.

10. The method according to claim 9, wherein determining, by the first virtual machine, a destination MAC address of a data packet to be sent comprises:
sending, by the first virtual machine, an ARP request packet by using the VF connected to the first virtual machine, wherein the ARP request packet carries a VLAN identifier of the VF that sends the ARP request packet;

broadcasting, by the switching equipment, the ARP request packet, wherein the ARP request packet is sent to the virtual bridge by using the uplink port;

forwarding, by the virtual bridge, the ARP request packet to a software-defined network (SDN) controller, and receiving a flow entry returned by the SDN controller, wherein the flow entry comprises an ARP pickup setting for instructing the virtual bridge to construct an ARP response packet based on the ARP request packet, and the ARP response packet carries the MAC address of the uplink port of the virtual bridge that is used as the destination MAC address of the data packet; and returning, by the virtual bridge, the ARP response packet to the first virtual machine, wherein the ARP response packet carries the MAC address of the uplink port of the virtual bridge that is used as the destination MAC address of the data packet.

11. The method according to claim 10, wherein the flow entry further comprises a MAC address setting for instructing the virtual bridge to change the destination MAC address of the data packet to the MAC address of the second virtual machine when the virtual bridge receives the data packet sent by the first virtual machine to the second virtual machine.

12. The method according to claim 8, wherein:
the uplink port of the virtual bridge is a PF of the first network port, and the virtual bridge is connected to the network interface card by using the PF; or
the uplink port of the virtual bridge is a selected VF of the first network port, and the virtual bridge is connected to the network interface card by using the selected VF, wherein the selected VF that is connected to the virtual bridge is set to a promiscuous mode.

13. The method according to claim 8, wherein:
the second virtual machine and the first virtual machine run on the host; and
the method further comprises: receiving, by the virtual bridge, the processed data packet, and sending the processed data packet to the second virtual machine according to the destination MAC address of the processed data packet by using the switching equipment.

14. The method according to claim 8, wherein:
the second virtual machine and the first virtual machine run on different hosts; and
the method further comprises: establishing, by the virtual network function module, a tunnel between the virtual network function module and a second virtual network function module on a host on which the second virtual machine is located, sending the processed data packet to a second network port of the network interface card, and sending, by using the tunnel, the processed data packet to the host on which the second virtual machine is located for enabling the second virtual network function module to send the processed data packet to the second virtual machine.

15. A cloud computing system, comprising:
at least one host, comprising:
a virtual machine monitor (VMM) comprising a virtual bridge and a virtual network function module,
at least one network interface card comprising switching equipment and a first network port, wherein the first network port supports a network interface card virtualization capability, the first network port is corresponding to at least one physical function (PF) and multiple virtual functions (VFs), and
a first virtual machine connected to at least one VF of the first network port;
a software-defined network (SDN) controller configured to receive an ARP request packet from the first virtual machine that is forwarded by the virtual bridge, and return a flow entry to the virtual bridge, wherein the flow entry comprises an ARP pickup setting and a MAC address setting for instructing the virtual bridge to construct an ARP response packet for the first virtual machine, and the ARP response packet carries a MAC address of an uplink port of the virtual bridge that is used as a destination MAC address of a data packet to be sent;
wherein the first virtual machine is configured to send the data packet to a second virtual machine by using the VF that is connected to the first virtual machine, wherein a destination IP address carried in the data packet is an IP address of the second virtual machine, and the destination MAC address carried in the data packet is the MAC address of the uplink port of the virtual bridge;
wherein the switching equipment is configured to receive the data packet, and send the data packet to the virtual bridge according to the destination MAC address of the data packet by using the uplink port of the virtual bridge;
wherein the virtual bridge is configured to receive the data packet, change the destination MAC address of the data packet to a MAC address of the second virtual machine, and send a changed data packet to the virtual network function module; and
wherein the virtual network function module is configured to perform network function processing on the changed data packet, and send the processed data packet, wherein a destination MAC address of the processed data packet is the MAC address of the second virtual machine.

16. The system according to claim 15, wherein the multiple VFs of the first network port have different virtual local area network VLAN identifiers.

17. The system according to claim 16, wherein:
the first virtual machine is further configured to send the ARP request packet by using the VF that is connected to the first virtual machine, wherein the ARP request packet carries a VLAN identifier of the VF that sends the ARP request packet;
the switching equipment is further configured to broadcast the ARP request packet, wherein the ARP request packet is sent to the virtual bridge by using the uplink port;
the virtual bridge is further configured to forward the ARP request packet to the SDN controller, and receive the flow entry returned by the SDN controller, wherein the flow entry comprises the ARP pickup setting for instructing the virtual bridge to construct the ARP response packet based on the ARP request packet, and the ARP response packet carries the MAC address of the uplink port of the virtual bridge that is used as the destination MAC address of the data packet; and
the virtual bridge is further configured to return the ARP response packet to the first virtual machine, wherein the ARP response packet carries the MAC address of the uplink port of the virtual bridge that is used as the destination MAC address of the data packet.

18. The system according to claim 17, wherein the flow entry further comprises the MAC address setting for instructing the virtual bridge to change the destination MAC address of the data packet to the MAC address of the second virtual machine when the virtual bridge receives the data packet that is sent by the first virtual machine to the second virtual machine.

19. The system according to claim 15, wherein:
the uplink port of the virtual bridge is a PF of the first network port, and the virtual bridge is connected to the network interface card by using the PF; or
the uplink port of the virtual bridge is a selected VF of the first network port, and the virtual bridge is connected to the network interface card by using the selected VF, wherein the selected VF that is connected to the virtual bridge is set to a promiscuous mode.

20. The system according to claim 15, wherein:
the second virtual machine and the first virtual machine run on the at least one host; and
the virtual bridge is further configured to receive the processed data packet, and send the processed data packet to the second virtual machine according to the destination MAC address of the processed data packet by using the switching equipment.

21. The system according to claim 15, wherein:
the second virtual machine and the first virtual machine run on different hosts; and
the virtual network function module is configured to establish a tunnel between the virtual network function module and a second virtual network function module on a host on which the second virtual machine is located, send the processed data packet to a second network port of the network interface card, and send, by using the tunnel, the processed data packet to the host on which the second virtual machine is located for enabling the second virtual network function module to send the processed data packet to the second virtual machine.

22. A host, comprising:
a first processor;
a first memory;
at least one network interface card comprising a second processor, a second memory, and a first network port, wherein the first network port supports a network interface card virtualization capability and corresponds to at least one physical (PF) and multiple virtual functions (VFs);
wherein the first memory stores instructions which, when executed by the first processor, cause the host to:
   implement a function of a first virtual machine, wherein the first virtual machine is connected to at least one VF of the first network port,
   implement a function of a virtual bridge, and
   implement a function of a virtual network function module;
wherein the second memory stores instructions which, when executed by the second processor, cause the host to:
   implement a function of switching equipment;
wherein the first memory stores instructions, when executed by the first processor, cause the host to:
   determine a destination MAC address of a data packet to be sent, wherein the MAC address of the data packet is a MAC address of an uplink port of the virtual bridge, and
   send the data packet to a second virtual machine by using the VF that is connected to the first virtual machine, wherein a destination IP address carried in the data packet is an IP address of the second virtual machine, and the destination MAC address carried in the data packet is the MAC address of the uplink port of the virtual bridge;
wherein the second memory stores instructions, when executed by the second processor, further cause the host to:
   receive the data packet, and send the data packet to the virtual bridge according to the destination MAC address of the data packet by using the uplink port of the virtual bridge; and
wherein the first memory stores instructions, when executed by the first processor, cause the host to:
   receive the data packet, and change the destination MAC address of the data packet to a MAC address of the second virtual machine, and
   perform network function processing on a changed data packet, and send the processed data packet, wherein a destination MAC address of the processed data packet is the MAC address of the second virtual machine.

23. The host according to claim 22, wherein:
the multiple VFs of the first network port have different virtual local area network (VLAN) identifiers;
the first memory stores instructions, when executed by the first processor, cause the host to:
   send an ARP request packet by using the VF that is connected to the first virtual machine, wherein the ARP request packet carries a VLAN identifier of the VF that sends the ARP request packet;
the second memory stores instructions, when executed by the second processor, further cause the host to:
   broadcast the ARP request packet, and send the ARP request packet to the virtual bridge by using the uplink port; and
the first memory stores instructions, when executed by the first processor, cause the host to:
   forward the ARP request packet to a software-defined network (SDN) controller,
   receive a flow entry returned by the SDN controller, wherein the flow entry comprises an ARP pickup setting for instructing the virtual bridge to construct an ARP response packet based on the ARP request packet, and the ARP response packet carries the MAC address of the uplink port of the virtual bridge that is used as the destination MAC address of the data packet, and
   return the ARP response packet to the first virtual machine, wherein the ARP response packet carries the MAC address of the uplink port of the virtual bridge that is used as the destination MAC address of the data packet.

24. The host according to claim 22, wherein the flow entry further comprises a MAC address setting for instructing the virtual bridge to change the destination MAC address of the data packet to the MAC address of the second virtual machine when the virtual bridge receives the data packet that is sent by the first virtual machine to the second virtual machine.

* * * * *